T. DELANY.
Strawberry-Protector.
No. 205,252. Patented June 25, 1878.
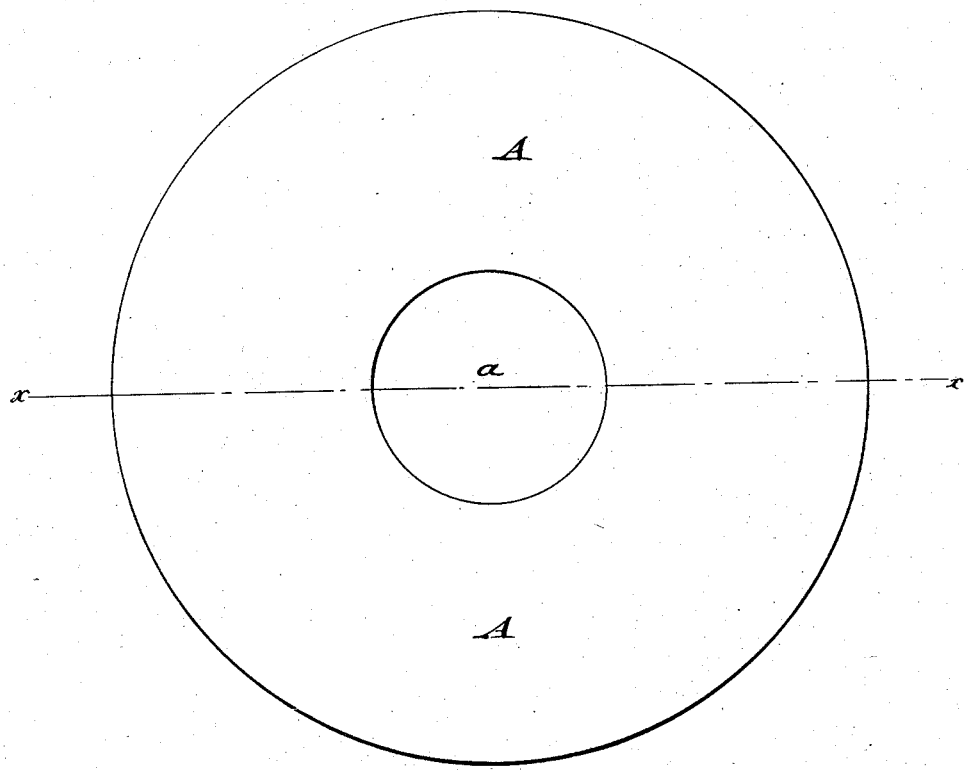
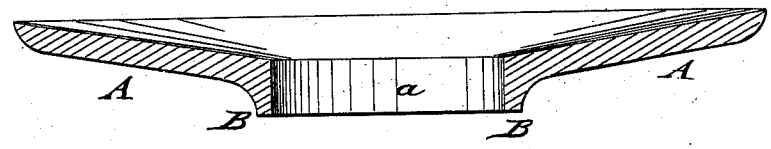
WITNESSES:
INVENTOR:

UNITED STATES PATENT OFFICE.

THOMAS DELANY, OF GENEVA, NEW YORK.

IMPROVEMENT IN STRAWBERRY-PROTECTORS.

Specification forming part of Letters Patent No. 205,252, dated June 25, 1878; application filed May 17, 1878.

*To all whom it may concern:*

Be it known that I, THOMAS DELANY, of Geneva, in the county of Ontario and State of New York, have invented a new and Improved Strawberry-Protector, of which the following is a specification:

In the accompanying drawing, Figure 1 represents a top view, and Fig. 2 a vertical central section, of my improved saucer for protecting strawberries, on line $x\,x$, Fig. 1.

Similar letters of reference indicate corresponding parts.

The object of this invention is to furnish an improved saucer for protecting strawberries and other small fruits in simple and effective manner against being covered with sand and dirt. The use of the saucer will also accelerate the growth of the plants and berries by shedding the water to the roots, and concentrating the rays of the sun immediately upon or about them.

The invention consists of a dishing saucer of circular shape, that encircles the plants and is provided with a center opening and supporting bottom rim or flange.

Referring to the drawing, A represents a saucer that is made of different sizes, and of glazed or unglazed clay, or of other material, according to the purposes for which it is required. The saucer is made of circular or other shapes, with a center opening, $a$, toward which the saucer dishes, so as to shed the rain-water toward the center. Around the central opening is arranged a bottom flange or rim, B, on which the saucer is supported in position. The saucer is placed in position around the strawberry or other small plant, which, when growing up, spreads out its leaves, blossoms, and berries upon the saucer, so that the saucer, as it is placed between the plant and the ground, protects them from becoming covered with sand and dirt splashed up by the rain.

The saucer also serves to shed the rain-water directly to the roots of the plants, and accelerates the ripening of the berries, as it concentrates the rays of the sun on the same.

Strawberries and other fruit may in this manner be obtained in superior marketable condition directly from the field, requiring less work to pick and clean them, while they are also ripened earlier in the season, so as to pay, by their higher price, for the expense incurred for the saucers.

I am aware that is not new to use a circular and centrally-apertured top convexed plate for the purpose of hastening the maturity of the strawberry; but

What I claim is—

A strawberry-saucer consisting of the top concaved plate A, having downward flange B and central aperture $a$, as shown and described.

THOMAS DELANY.

Witnesses:
   S. SOUTHWORTH,
   JOHN B. DIXON.